United States Patent [19]
Ide

[11] Patent Number: 5,740,529
[45] Date of Patent: Apr. 14, 1998

[54] METHOD AND APPARATUS FOR CONTROLLING POWER SUPPLIED TO A RECEIVER BASED ON DETECTION OF ERRORS IN GROUPS OF DATA IN A SIGNAL BEING RECEIVED BY SAID RECEIVER

[75] Inventor: Motoki Ide, Tokyo, Japan

[73] Assignee: NEC Corporation, Tokyo, Japan

[21] Appl. No.: 325,921

[22] Filed: Oct. 17, 1994

[30] Foreign Application Priority Data

Oct. 15, 1993 [JP] Japan .................... 5-280656

[51] Int. Cl.⁶ .................................... H04B 1/16
[52] U.S. Cl. ............... 455/343; 455/38.3; 340/825.44
[58] Field of Search .................. 455/38.3, 127, 455/343; 340/825.44

[56] References Cited

U.S. PATENT DOCUMENTS

| | | | |
|---|---|---|---|
| 4,652,875 | 3/1987 | Waki | 340/825.44 |
| 4,668,949 | 5/1987 | Akahori et al. | 340/825.47 |
| 4,839,639 | 6/1989 | Sato et al. | 340/825.44 |
| 4,964,121 | 10/1990 | Moore | 370/100.1 |
| 5,001,471 | 3/1991 | Snowden et al. | 340/825.21 |
| 5,251,325 | 10/1993 | Davis et al. | 455/343 X |
| 5,274,843 | 12/1993 | Murai et al. | 455/343 X |
| 5,381,133 | 1/1995 | Erhart et al. | 455/343 X |

FOREIGN PATENT DOCUMENTS

| | | |
|---|---|---|
| 0319219 | 6/1989 | European Pat. Off. . |
| 115632 | 4/1992 | Japan . |
| WO 91 10282 | 7/1991 | WIPO . |

*Primary Examiner*—Chi H. Pham
*Attorney, Agent, or Firm*—Sughrue, Mion, Zinn, Macpeak & Seas

[57] ABSTRACT

A synchronization controller identifies the timing of the group assigned to the receiver based on a synchronization signal detected by a preamble and synchronization signal detector. At this timing the power supply of a radio section is turned on. A selective calling number within the received group and pre-assigned selective calling number are compared in a selective calling number detector. The power supply of the radio section is immediately turned off, if the result of the comparison is non-coincidence. In this way, the battery saving efficiency can be enhanced by arranging to turn on the radio section only in the groups which are assigned to the receiver, and turning off immediately the power supply of the radio section when the receivers assigned selective calling number is not found in the receiver's assigned group.

9 Claims, 6 Drawing Sheets

CODE WORD (BCH (31,21)+PARITY)

METHOD AND APPARATUS FOR CONTROLLING POWER SUPPLIED TO A RECEIVER BASED ON DETECTION OF ERRORS IN GROUPS OF DATA IN A SIGNAL BEING RECEIVED BY SAID RECEIVER

BACKGROUND OF THE INVENTION

1. Field of the Invention

The present invention relates to a power supply control and, more particularly, to a power supply control for a selective calling receiver having a battery saving function.

2. Description of the Related Art

In a prior art selective calling receiver, a controller supplies a battery current to a receiving portion therein only when the receiver receives a synchronizing signal and a frame assigned to its own receiver to reduce consumption of the battery. Namely, the receiving portion is turned on only at each timing of the synchronizing signal and the assigned frame and is turned off at other times.

However, since several receivers are assigned to one frame, the frame may not include a message for the receiver if the receiver turns the receiving portion on at a timing of the assigned frame. Therefore, an improved receiver is disclosed in, for example, Japanese Patent Laid-Open Application No. 115632/1992 (JP 04-115632.) This receiver detects whether a message addressed to its own receiver is included or not and turns the receiving portion off immediately after determining that the addressed message is not included in the frame.

While such a receiver can reduce consumed current, since the receiver turns the receiving portion on at a timing of each synchronizing signal, the receiver still consumes too much current and therefore the battery life is unnecessarily shortened.

SUMMARY OF THE INVENTION

It is therefore an object of the present invention to provide a selective calling receiver which enhances the battery saving efficiency by improving the receiving operation for the synchronizing signals and the frames which are assigned to the receiver.

Another object of the present invention is to provide a selective calling receiver capable of reducing the required capacity of the battery.

It is further object of the present invention to provide a selective calling receiver capable of using a small size battery.

It is still further object of the present invention to provide a miniaturized selective calling receiver.

In a selective calling receiver having a battery saving function which carries out reception in the groups or frames assigned to the receiver itself out of received signals consisting of a plurality of blocked error correction code sequences, the present invention is equipped with first detecting means for detecting a first synchronizing signal followed a preamble signal from a received signal and first control means for generating a first timing signal at the timing of groups assigned to the receiver within the received signal, and for turning a radio section in the receiver on in response to the first timing signal and for keeping the radio section off at reception timings of synchronizing signals after the detection of the first synchronizing signal.

According to the present invention, the battery saving efficiency is enhanced by not turning the radio section on at the timings of the synchronizing signals following the detection of a first synchronizing signal, but by turning on the radio section only at the frames assigned to the receiver itself, and, during the reception, immediately turning off the power supply of the radio section when its own selective calling number or ID is not found in the second word of the frame.

BRIEF DESCRIPTION OF THE DRAWINGS

The above and other objects, features and advantages of this invention will become more apparent from the following detailed description taken with the accompanying drawings in which.

In the drawings, the same reference numerals denote the same structural elements.

DESCRIPTION OF THE PREFERRED EMBODIMENT

Now a preferred embodiment of the present invention will be described in detail with reference to FIGS. 1 to 6.

Figure 1:
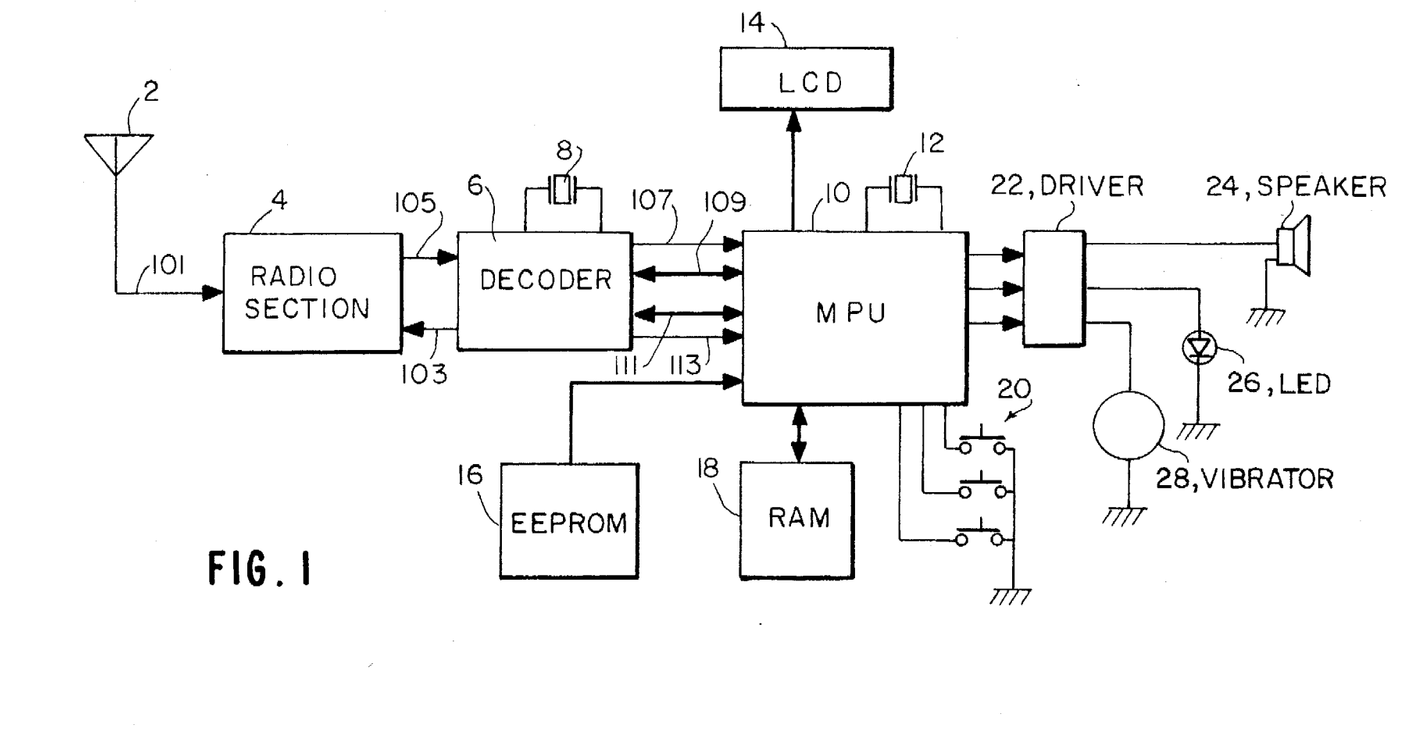
FIG. 1 is a block diagram of a preferred embodiment of the present invention.

FIG. 1 is a block diagram of a preferred embodiment of the present invention. A modulated signal 101 received from an antenna 2 is demodulated in a radio section 4. The radio section 4 carries out intermittent receiving operation in accordance with a battery saving control signal 103 of a decoder 6. A microprocessor (referred to as MPU hereinafter) 10 reads a selective calling number or an identification number (ID) of the receiver itself set in advance in an EEPROM 16, and sends the selective calling number to the decoder 6 using an address bus 109. The decoder 6 compares the selective calling number from the EEPROM 16 with a signal 105 demodulated in the radio section 4, and informs the MPU 10 of the detection of the selective calling number using an MPU interface, namely, an interrupt signal 107, the address bus 109 and a data bus 111, if the result of the comparison shows coincidence.

Figure 2A:
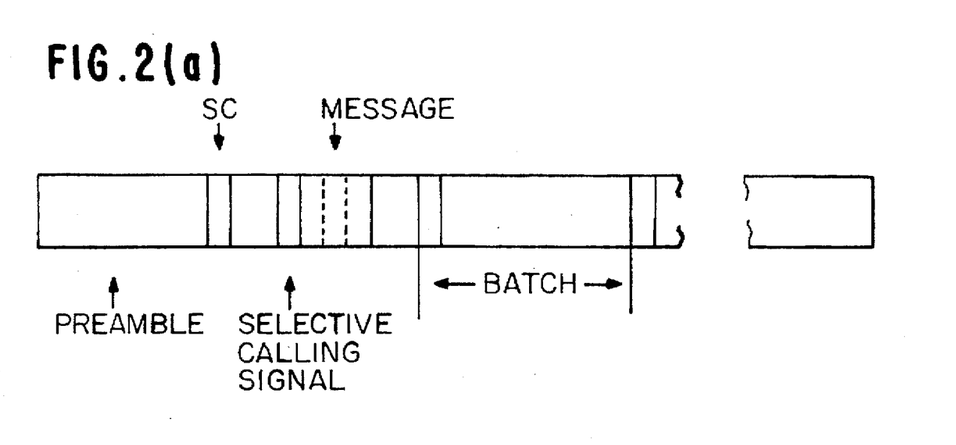
FIGS. 2(a)–2(c) illustrate a POCSAG format using in the present invention.
Figure 2B:
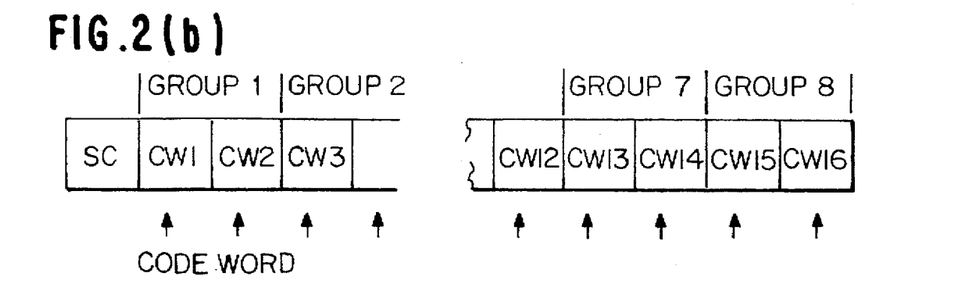
Figure 2C:
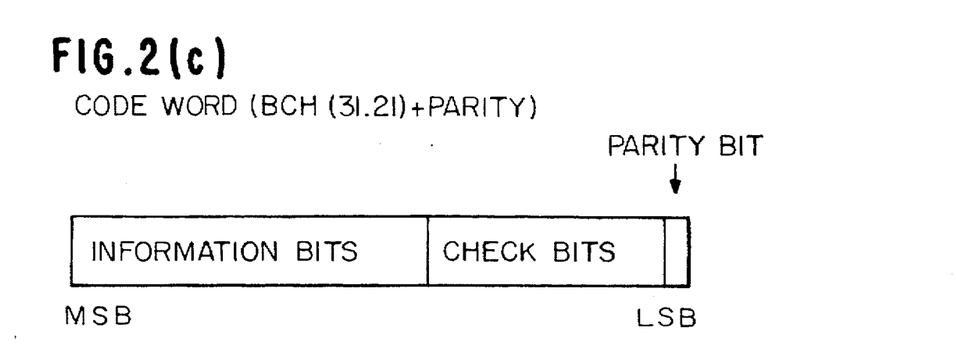

FIGS. 2(a) to 2(c) illustrate a signal format, proposed by a post office code standardization advisory group (POCSAG), which is used with the present invention. In FIG. 2(a), the POCSAG signal format is constituted of a preamble signal which is a repeat signal of "1" and "0" and which consists of 576 bits, and a plurality of batches each consisting of a synchronizing signal SC and a plurality of lines of code words including a selective calling signal, a message signal and the like. As shown in FIG. 2(b), the batch is divided into the SC and a group of eight frames, where each group comprises two code words. Each code word has 21 bits of information, 10 check bits for check and a parity bit as shown in FIG. 2(c).

Returned to FIG. 1, after the coincidence of the selective calling number, error correction of data, such as the check bits, sent following the selective calling signal is carried out, and transfers the information bits to MPU 10 using the MPU interface for every code word.

The MPU 10 receives the detection information on the selective calling number from the decoder 6, and stores the detection information in a RAM within MPU or an external RAM 18. If thereafter signals are sent continuously from the decoder 6, the MPU 10 judges whether the signals are a piece of message information signals or the selective calling number, and the piece of the message information signals are stored in the buffer area of the RAM within MPU or within the external RAM 18 if they represent a piece of the message information signals. This operation is processed by MPU 10 using an oscillator 8 as the operating clock. If the signals turn out to be the selective calling number, signal acquisition is stopped at that moment, an MPU operating clock of an oscillator 12 is actuated, and the signals accumulated so far in the buffer are processed using the MPU operating clock 12 to he converted to a message, for example, character data and the signals are stored in the message memory area within the external RAM 18.

After completion of message signal reception, MPU 10 notifies the user of the receiver of the arrival of a call by driving a speaker 24, an LED 26 or a vibrator 28 via a driver 22, and displays the contents of the received message on an LCD 14. Which one of the speaker 24, LED 26 and vibrator 28 is to be used for the notification is set before hand in the EEPROM 16, and is determined by the combination of a piece of information and the setting of a function switch 20.

The message stored in the RAM within MPU or in the external RAM 18 can be displayed again on the LCD 14 by means of the function switch 20.

Figures 3A, 3B, 3C:
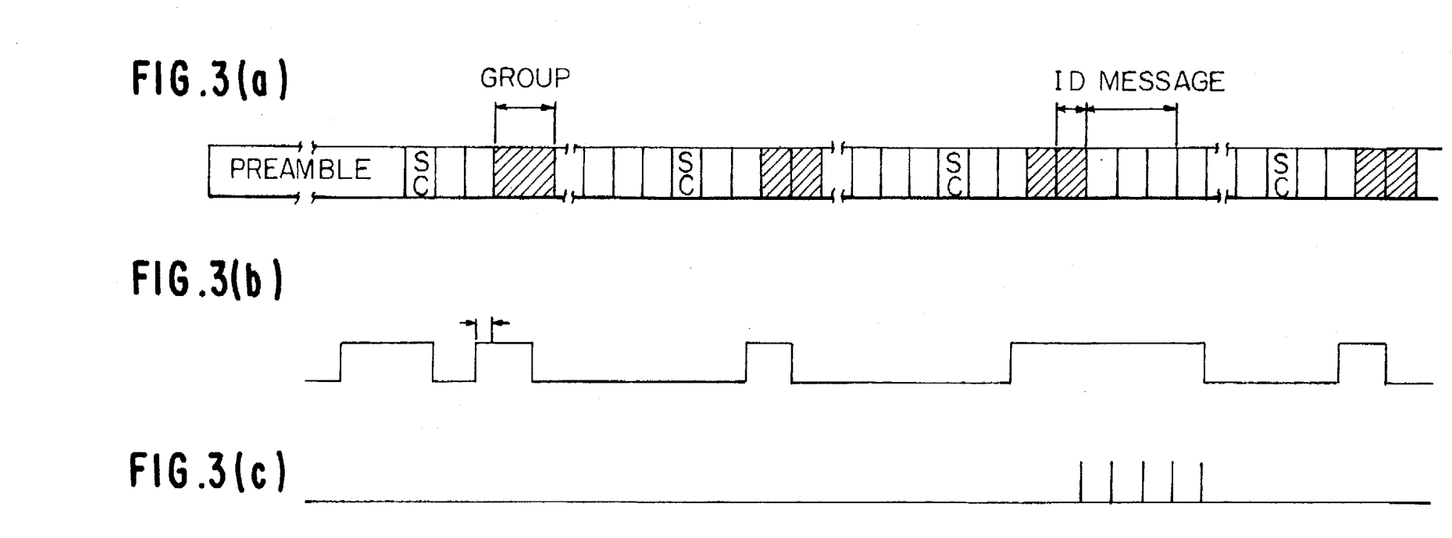
FIGS. 3(a)–3(d) illustrate timing charts to explain a battery saving operation according to the present invention.

FIGS. 3(a) to 3(d) illustrate a received signal and a timing chart of battery saving operation according to the present invention. In FIG. 3(a), hatched parts are pre-assigned groups each of which consists of two code words.

FIG. 3(b) illustrates a timing chart of the timings of the battery saving control signal 103 which carries out the message receiving operation of the radio section 4, decoder 6 and MPU 10. After the preamble signal is detected and then the synchronizing signal SC is detected, the radio section is turned on exclusively at the timings of the code words of the group which is assigned to its own receiver, preferably, is turned on before the timing of the group so as to receive the first bit of the group. Accordingly, the radio section is put to the off-state at the timings of the synchronizing signals SC that appear later. Moreover, during the reception of the code words of the group which is assigned to that receiver, the radio section is brought to the off-state in the midst of the second code word as soon as the decoder detects that the own ID is not found.

Furthermore, when the receiver's ID is detected in the code word of the group which is assigned to the receiver, two code words are fully received by keeping the on-state as is, then MPU 10 reads the message signal from the decoder 6 at the timing of the interrupt signal 107 shown in FIG. 3(c), and stores the message signal in the buffer memory.

Figure 3D:
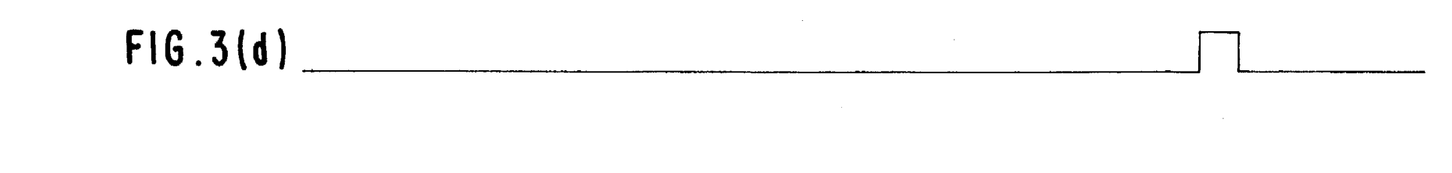

FIG. 3(d) illustrates the oscillation timings of the MPU operating clock of the oscillator 12. The high level in the time chart represents that the operating clock is oscillated there. With this timing, MPU 4 processes the message signal within the buffer memory using the MPU operating clock 12 as the working clock, and stores the message signal in the message memory as a character data.

Next, an example of circuiting for executing the above-mentioned battery saving operation according to the present invention will be described in detail with reference to FIGS. 4 to 6.

Figure 4:
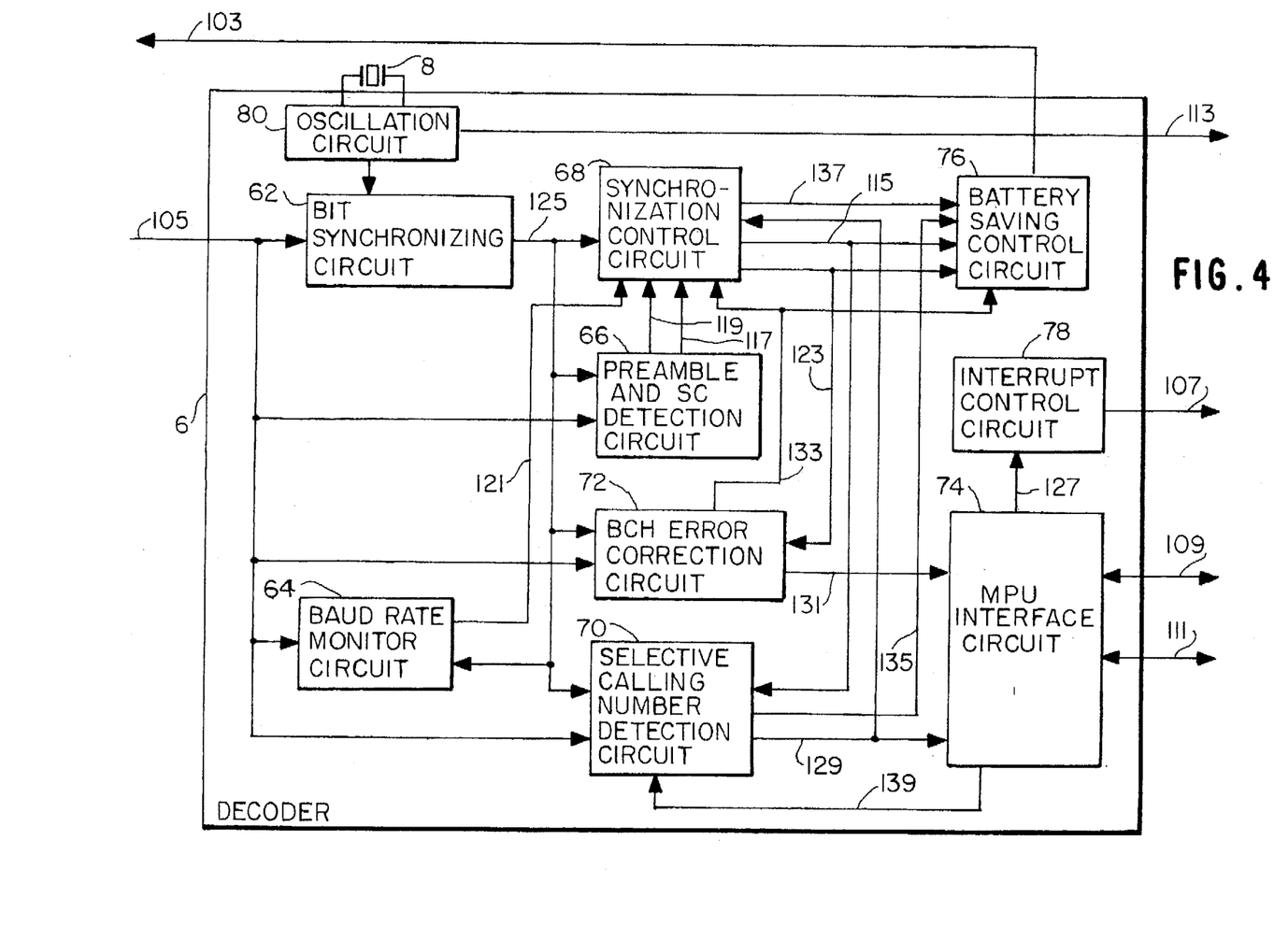
FIG. 4 is a block diagram of a preferred embodiment of the decoder shown in FIG. 1.

FIG. 4 is a block diagram of preferred embodiment of the decoder 6 shown in FIG. 1. A bit synchronizing circuit 62 generates a regenerated clock 125 using reference clock from an oscillator circuit 80 and the demodulated signal 105 from the radio section 4.

A Baud rate monitor circuit 64 compares the regenerated clock 125 with the demodulated signal 105 to decide whether it is a bit rate of a POCSAG signal to be received, and outputs a bit rate detection signal 121. It is used in actuating the operation of a search for the SC signal from the battery saving operation in a state where a POCSAG signal is not being received, and can be used for releasing the battery saving operation even for a signal other than the preamble signal.

A preamble and SC detection circuit 66 generates a detection signal 117 which detects the preamble signal by sampling the demodulated signal 105 using the regenerated clock 125. As it detects the ensuing synchronizing signal SC, it generates a synchronization detection signal 119.

A synchronization control circuit 68 controls the establishment/releasing of synchronization. In the state where a POCSAG signal is not being received, it is engaged in the battery saving operation for preamble search mode, and outputs a continuous reception signal 137 to keep the radio section in the receiving condition by receiving the preamble detection signal 117 or the bit rate detection signal 121. The synchronization control circuit 68 is brought to the synchronizing state by the synchronization detection signal 119 to resume the battery saving operation for selective calling number search mode, and receives the selective calling number at the timings of the pre-assigned group. The synchronization control circuit 68 outputs a group timing signal 115 at the pre-assigned group and a word timing signal 123 during the synchronization state. In addition, the circuit 68 outputs the continuous reception signal 137 for receiving the ensuing message signal by receiving a coincidence detection signal 129 from a selective calling number detection circuit 70 to be described later. Further, the circuit 68 counts BCH error detection of consecutive two code words in its own group by an error checking signal 133 from a BCH error correction circuit 72 to be described later, and goes over to the preamble search mode by releasing the synchronization state when a count reaches a predetermined level.

The selective calling code detection circuit 70 sequentially collates the received selective calling number with a pre-assigned selective calling number 139 via an MPU interface circuit 74 from the MPU 10 at the timings of the group timing signal 115 from the synchronization control circuit 68, and outputs the coincidence detection signal 129 to the synchronization control circuit 68 and an MPU interface circuit 74. If non-coincidence, preferably of more than two bits, is detected, the selective calling number detection circuit 70 immediately outputs a non-coincidence detection signal 135 to a battery saving control circuit 76.

The BCH error correction circuit 72 carries out error correction of the demodulated signal 105 at the timings of the word timing signal 123 from the synchronization control circuit 68, and outputs a message signal 131 to MPU 10 via the MPU interface circuit 74. In addition, it checks the errors in the code word received in the synchronization state, and outputs an error check signal 133 to the synchronization control circuit 68.

The MPU interface circuit 74 controls the MPU interface such as address bus 109 and data bus 111, and controls signal input/output for MPU 10.

The battery saving control circuit 76 holds for the duration of one word the error checking signal 133 of the BCH error correction circuit 72 at the timings of the group timing signal 115 and the word timing signal 123 from the synchronization control circuit 68. When the battery saving control circuit 76 receives the non-coincidence detection signal 135 for the selective calling number in the second word of its own group, it immediately turns off the power supply of the radio section 4 by controlling the battery saving control signal 103 if the held contents of the BCH check in the first word on its own group shows that an error was not detected.

An interrupt control circuit 78 outputs an interrupt signal 107 to the MPU 10 based on an interrupt request signal 127 from the MPU interface circuit 74 when there arose a change in data to be sent to MPU 10 or in the operating conditions. The oscillation circuit 80 generates the reference clock 113 by an oscillator 8.

Figure 5:
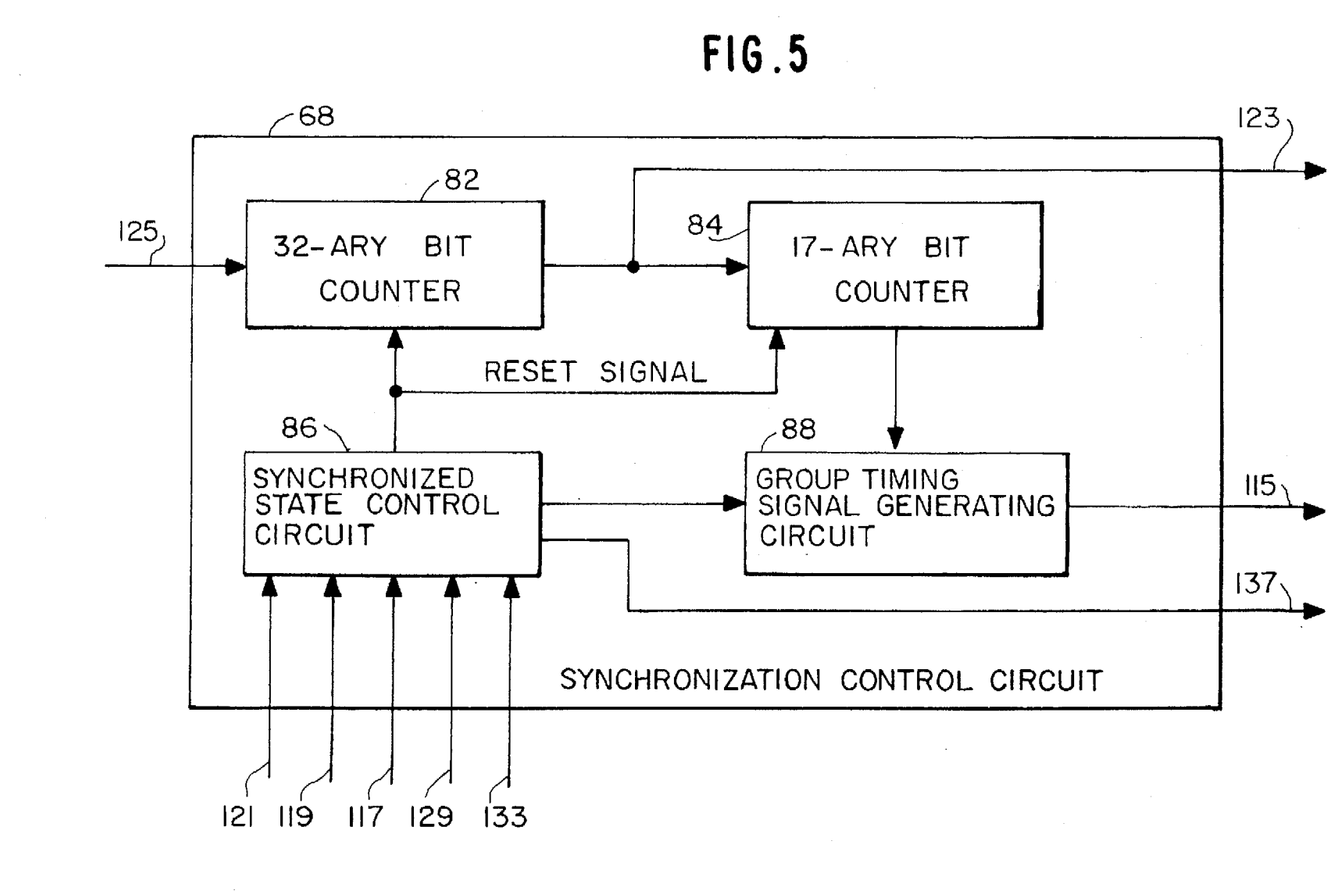
FIG. 5 is a block diagram of a preferred embodiment of the synchronization control circuit shown in FIG. 4.

FIG. 5 is a block diagram of a preferred embodiment of the synchronization control circuit 68 shown in FIG. 3. A 32-ary bit counter 82 counts the regenerated clock 125 from the bit synchronizing circuit 62 and generates the word timing signal 123 which determines the reference timing of one word. A 17-ary word counter 84 generates a timing signal for 17 words corresponded to 1 batch length. A self group timing signal generating circuit 88 generates a group timing signal 115 at the timing of the pre-assigned group after a predetermined term passed from a detection of synchronizing signal and at the timing of the pre-assigned group in the following batch after a detection of the selective calling number. For example, the self group timing signal generating circuit comprises a comparison circuit. The comparison circuit compares the value of the counter 84 with a predetermined value showing a position of the group assigned to the receiver and generates the group timing signal when the values are coincident. A synchronized state control circuit 86 controls the synchronized state using the preamble detection signal 117, the bit rate detection signal 121, the synchronizing signal detection signal 119, the error checking signal 133 and the selective calling number coincidence detection signal 129 as the actuating signals, and generates the continuous reception signal 137 and a reset signal to the 32-dry and 17-dry bit counters 82 and 84 in response to the synchronizing signal detection signal 119.

Figure 6:
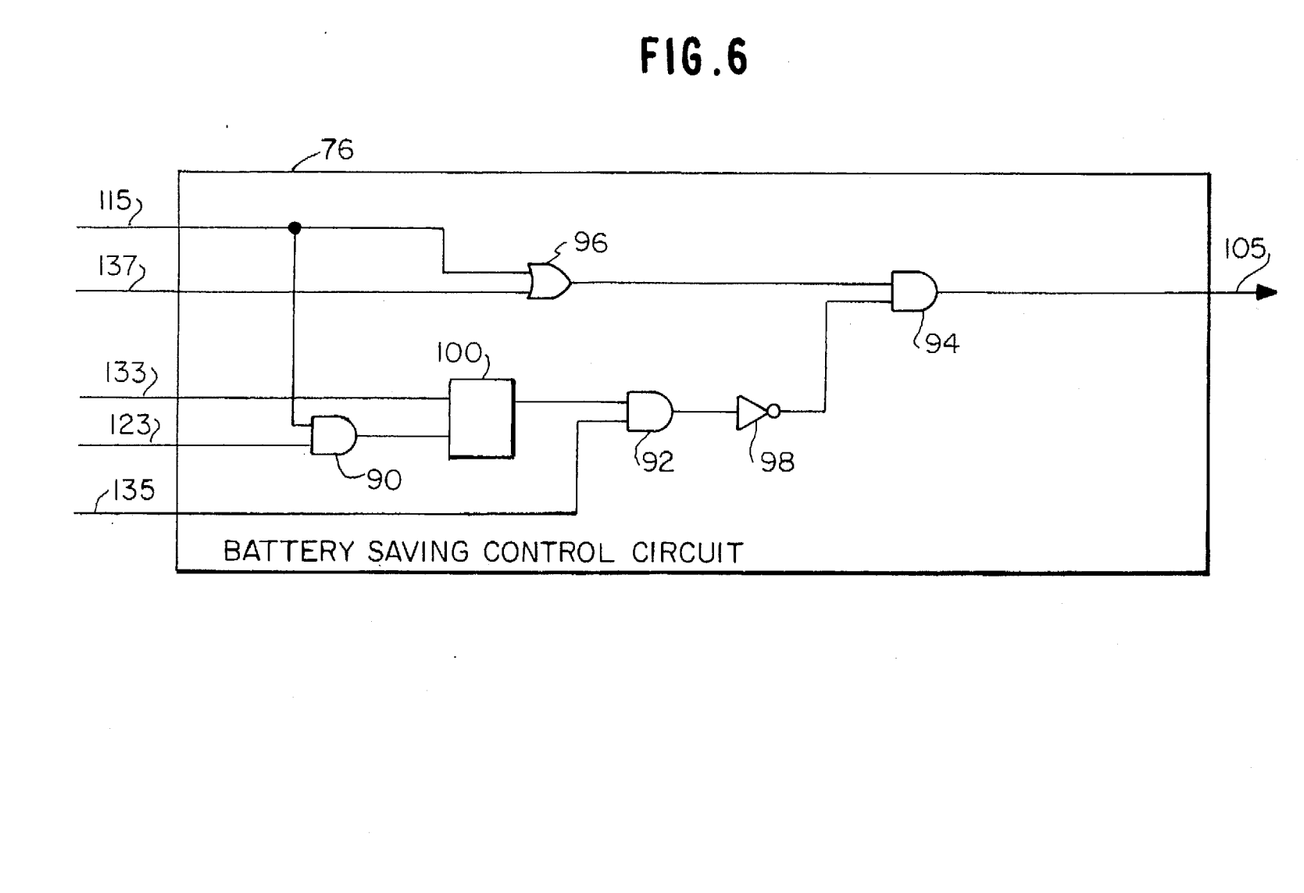
FIG. 6 is a block diagram of a preferred embodiment of the battery saving control circuit shown in FIG. 4.

FIG. 6 is a block diagram of a preferred embodiment of the battery saving control circuit 76 shown in FIG. 3. The circuit 76 consists of AND gates 90, 92 and 94, an OR gate 96, and an inverter 98 and a latch 100 for an error check signal holding means. The latch 100 latches the error checking signal 133 of the BCH error correction circuit 72 at the timing of the inputting of the self group timing signal 115 from the synchronization control circuit 68 and the word timing signal 123, and holds the error checking signal 133 for the duration of one word. If the non-coincidence detection signal 135 of the selective calling signal at the second word of its own group and the latched error checking signal are input to the AND gate 92, the circuit 76 immediately turns off the power supply of the radio section 4 at the second word of its own group by controlling the battery saving control signal 103 when the self group timing signal 115 or continuous reception signal 137 is supplied to the AND gate 94 via the OR gate 96.

Therefore, according to this selective calling receiver of the present invention, after the detection of the preamble and the synchronizing signal SC in the preamble and SC detection circuit 66, the bits in the selective calling number are sequentially compared with the pre-assigned selective calling number in the selective calling code detection circuit 70 exclusively at the timings of the groups, namely, the code words assigned to the receiver itself, by the synchronization control circuit 68. The selective calling number detection circuit 70 detects immediately selective calling number non-coincidence and outputs a number non-coincidence signal when there occurred non-coincidence of bits for a number of times that exceeds a predetermined level. Moreover, selective calling number coincidence is detected and a number coincidence signal is output when non-coincidence occurred only for a number of bits smaller than the predetermined level.

In the battery saving control circuit 76, the result of the block error checking output at the completion of one block of the error correction code and received by the BCH error correction circuit 72 is held for at least the duration of one block. The power supply for the radio section 4 is controlled in response to the error non-detection output of the error check output holding means issued in the preceding block, and the non-coincidence output in the block in question.

As described hereinbefore, since, according to the present invention, the radio section is turned on only in the frames or groups which are pre-assigned to the receiver, without turning the radio section on at the timings of the synchronizing signals after the synchronizing signal is detected once, and the power supply for the receiving circuit is turned off immediately when its own ID is not found in the code words which constitute the receiver's frame during the reception, it is possible to enhance the battery saving efficiency in comparison to the conventional system in which power is supplied during the entirety of each synchronizing signal and the two code words of the frame to which the receiver belongs. In this way, the battery life can be prolonged by reducing the average consumed current of the receiver.

Further, it becomes possible to use a small-sized battery which shows that the present invention has an effect of contributing to the miniaturization of the selective calling receiver.

Although the embodiment has been described with respect to a case in which the modification was based on a specific arrangement, it goes without saying that the present invention is not restricted to this case.

What is claimed is:

1. A receiver with a power supply control feature for a radio section responsive to signals containing a preamble and multiple batches, each batch containing a synchronizing signal and multiple codeword groups, said receiver being assigned to at least one of said groups, comprising:

means for detecting a first synchronizing signal included in one batch;

means for detecting an error of the group assigned to said receiver after detecting said first synchronizing signal;

means for preventing power application to said radio section at timings of synchronizing signal receptions after a detection of said first synchronizing signal and when a number of said error is lower than a predetermined amount; and means for turning on said radio section on detection of said first synchronizing signal, and at reception timings of the group assigned to said receiver when the number of said error is lower than a predetermined amount.

2. The power supply control as claimed in claim 1, wherein each said group contains a selective calling number, said power supply control further comprising:

means for turning off said radio section when selective calling number in the receiver's assigned group is not the same as a selective calling number assigned to said receiver.

3. A receiver comprising:

first detecting means for detecting a first synchronizing signal following a preamble signal in a received signal, said received signal including said preamble and a plurality of batches, each batch consisting of said synchronizing signal and several groups which include first and second codeword blocks;

first control means for generating a first timing signal at the timing of each group assigned to said receiver within said received signal, and for turning a radio section in said receiver on in response to said first timing signals and for maintaining said radio section off at reception timings of synchronizing signals after said detection of said first synchronizing signal;

second detecting means for detecting a selective calling number in one of said codeword blocks, said receiver being assigned a particular selective calling number;

error checking means for checking a block error in an error correction code received in said blocks; and second control means for turning said radio section off in response to no detection of said particular selective calling number and detection of a result of no block error.

4. The power supply control as claimed in claim 3, wherein said second control means comprises:

latching means for latching a result of said block error for one codeword block;

an AND gate for inputting said result of said block error and a signal indicating said detection of said particular selective calling number; and supplying means for supplying a battery saving control signal to said radio section to turn off when said particular selective calling signal is not detected and no block error is detected.

5. The power supply control as claimed in claim 3, further comprising monitoring means for monitoring a bit rate of said received signal; and third control means for turning said radio section off when said bit rate of the received signal is different from a predetermined rate.

6. The power supply control as claimed in claim 3, further comprising first generating means for generating a regenerated clock based on a reference clock and said received signal and for supplying said regenerated clock to said first detecting means and said first control means as a operation clock.

7. The power supply control as claimed in claim 6, wherein said received signal comprises said preamble and a plurality of batches, each batch consisting of said synchronizing signal and several groups which include first and second codeword blocks, said first control means comprises:

second generating means for generating a second timing signal at a timing of each said group based on said regenerated clock and said detection of said first synchronizing signal; and third generating means for generating said first timing signal in response to said second timing signal.

8. The power supply control as claimed in claim 3, wherein said first control means turns said radio section on before the reception timings of said assigned groups.

9. A method for controlling a power supply to a radio section in a receiver, the method comprising the steps of:

detecting a first synchronizing signal followed a preamble signal in a received signal;

generating a first timing signal at the timing of groups assigned to said receiver within said received signal;

detecting an error of a pre-assigned group in said received signal;

turning a radio section in said receiver on in response to said first timing signal; and keeping said radio section off at reception timings of synchronizing signals when the error is below a predetermined level, after said detection of said first synchronizing signal.

* * * * *